(12) United States Patent
Widmer et al.

(10) Patent No.: US 7,398,886 B2
(45) Date of Patent: Jul. 15, 2008

(54) PRESS FOR DEWATERING A HUMID SUBSTANCE, IN PARTICULAR RESIDUAL REFUSE

(75) Inventors: Christian Widmer, Holzistrasse 9, 4102, Binningen (CH); Hansrudolf Hartmann, Gelterkinden (CH)

(73) Assignee: Christian Widmer, Binningen (CH)

( * ) Notice: Subject to any disclaimer, the term of this patent is extended or adjusted under 35 U.S.C. 154(b) by 215 days.

(21) Appl. No.: 10/488,721

(22) PCT Filed: Sep. 3, 2002

(86) PCT No.: PCT/EP02/09852

§ 371 (c)(1), (2), (4) Date: Mar. 3, 2004

(87) PCT Pub. No.: WO03/020498

PCT Pub. Date: Mar. 13, 2003

(65) Prior Publication Data

US 2004/0238436 A1    Dec. 2, 2004

(30) Foreign Application Priority Data

Sep. 3, 2001    (DE) ............................... 101 43 004

(51) Int. Cl.
*B01D 29/64* (2006.01)
*B01D 29/84* (2006.01)
*B30B 9/14* (2006.01)
*C02F 11/12* (2006.01)

(52) U.S. Cl. .................... 210/415; 210/413; 100/117; 34/70; 34/398

(58) Field of Classification Search ............... 210/413, 210/415; 100/117; 34/70, 398
See application file for complete search history.

(56) References Cited

U.S. PATENT DOCUMENTS

| | | | |
|---|---|---|---|
| 3,230,865 A | | 1/1966 | Hibbel et al. |
| 3,938,434 A | | 2/1976 | Cox |
| 5,489,383 A | * | 2/1996 | Yoshikawa .................. 210/413 |
| 5,516,427 A | * | 5/1996 | Yoshikawa .................. 210/413 |
| 5,802,961 A | * | 9/1998 | Hay et al. .................... 99/406 |
| 2004/0238436 A1 | * | 12/2004 | Widmer et al. .............. 210/415 |

FOREIGN PATENT DOCUMENTS

| | | | |
|---|---|---|---|
| DE | 19909328 | | 5/2000 |
| FR | 2077817 | | 11/1971 |
| HU | 180024 | | 5/1982 |
| HU | 213280 | | 6/1993 |
| HU | 214066 | | 6/1995 |
| HU | P9702295 | | 9/1998 |
| JP | 59113997 | | 6/1984 |
| JP | 60152395 | | 8/1985 |
| JP | 10099609 | | 4/1998 |
| JP | 2001205489 | | 7/2001 |
| WO | 00/01994 | * | 1/2000 |

* cited by examiner

*Primary Examiner*—Thomas M. Lithgow
(74) *Attorney, Agent, or Firm*—Boyle Fredrickson, S.C.

(57) ABSTRACT

A press for the dehumidification of humid matter, in particular of residual waste is disclosed, which comprises a worm gear whereby the residual waste may be compressed mechanically. During transport with the aid of the worm gear, the humid matter is subjected to a drying medium, preferably pressurized air or a vacuum, whereby it is delivered from the press.

7 Claims, 2 Drawing Sheets

PRESS FOR DEWATERING A HUMID SUBSTANCE, IN PARTICULAR RESIDUAL REFUSE

BACKGROUND OF THE INVENTION

1. Field of the Invention

The invention relates to a press for the dehumidification of humid matter, in particular a press for the dehumidification of residual waste.

2. Description of the Related Art

DE 199 09 328 A1 describes a method for processing residual waste, wherein mechanically processed residual waste is biologically stabilized by an aerobic hydrolysis. In such an aerobic hydrolysis, water and air are supplied to the residual waste to be treated in counterflow, so that by cooperation of air and leaching fluid organic cells of the residual waste are broken up and cell water is released. The available carbon is decomposed to carbon dioxide, and the dissolved and acidified organic matter is transported off by the leaching fluid and also partly by the air. Through this aerobic hydrolysis a dumping method is actually realized in an accelerated manner.

The residual waste thus biologically stabilized has a relatively low proportion of dry substance, so this hydrolysis has to be followed by dehydration. In the solution known from DE 199 09 328 A1, this dehydration is carried out by a high-pressure press, for instance an extruder press. In a like extruder press the residual waste to be dehydrated is drawn in by a worm gear, compacted, and the pressed-out water is carried off.

It was found that the dry substance content of the residual waste dehydrated in this manner is still relatively low, so that comparatively high expenditure for post-drying of the residual waste is necessary.

SUMMARY OF THE PRESENT INVENTION

In contrast, the invention is based on the objective of furnishing a press for the dehumidification of humid matter, wherein the expenditure for post-drying is reduced.

This objective is attained by a press for the dehumidification of a humid substance, in particular of residual refuse, which includes a worm gear whereby the humid matter is transported from a material drawing-in device to a material discharge and is concurrently compressed for the dehumidification, the press including a means whereby the humid matter compressed with the aid of the worm gear is subjected to a drying medium, wherein the drying medium is one of a group including pressurized air and vacuum, so that the drying medium either flows through the humid matter or the humidity is transported off, respectively, and wherein the means includes a central tube encompassed by the worm gear and designed to include outlet nozzles for the drying medium.

In accordance with the invention, the press includes a worm gear whereby the humid matter may be transported from a drawing-in section to a material discharge, and compressed. In addition to this mechanical compression, the humid matter is furthermore exposed to pressurized air or to vacuum, whereby further dehumidification of the humid matter takes place. This means that in accordance with the invention, a mechanical dehydration is superseded by a dehydration by convection or a dehydration by vacuum. It is preferred, however, if dehydration is achieved substantially by the application of pressurized air.

It was found in preliminary trials that by this variant the dry substance content of the humid matter to be treated may be increased substantially in the absence of post-drying when compared with the conventional solutions, with the possibility of achieving dry substance contents of up to 70% in the treatment of residual waste. It is one essential advantage of this means that owing to parallel application of a drying medium (drying air) or of vacuum, the expenditure in terms of device technology for manufacturing the press is only increased insignificantly, for the necessary pumps, piping, etc. may be installed at little expenditure.

In a particularly preferred embodiment, the drying medium is supplied via a lance-type central tube encompassed by the worm gear, which has outlet nozzles for the drying medium formed at one end portion. The drying medium then flows through the humid matter approximately in a direction transverse to the longitudinal axis of the worm gear.

This central tube may be non-rotary or mounted to rotate as a unit with the worm gear.

Delivery of the freighted drying medium is particularly simple if, approximately in the range of the outlet nozzles at the housing of the worm gear, a strainer basket or similar means is provided which retains the residual waste to be treated and allows the passage of the freighted drying medium.

Flow management of the drying medium is particularly simple if extraction of the freighted drying medium is achieved by being supported with the aid of the reduced pressure.

In the case of a like reduced pressure solution, there is provided downstream of the strainer basket a condenser whereby the discharged humidity may be condensed.

For adjusting the mechanical pressing pressure applied through the intermediary of the worm gear, it is possible to provide at a material discharge of the press a backup pressure or counterpressure means so that—depending on the consistency of the humid matter to be treated—different backup pressures may be set.

In a variant of the invention for the treatment of residual waste, the drying medium is supplied with a pressure exceeding the pressure at the material discharge by about 1 bar, whereas a slightly reduced pressure is applied in the extraction range.

Further advantageous developments of the invention are the subject matters of the further subclaims.

BRIEF DESCRIPTION OF THE DRAWINGS

A preferred embodiment of the invention shall be explained in more depth hereinbelow by referring to schematic drawings, wherein.

DETAILED DESCRIPTION OF THE PREFERRED EMBODIMENTS

Figure 1:
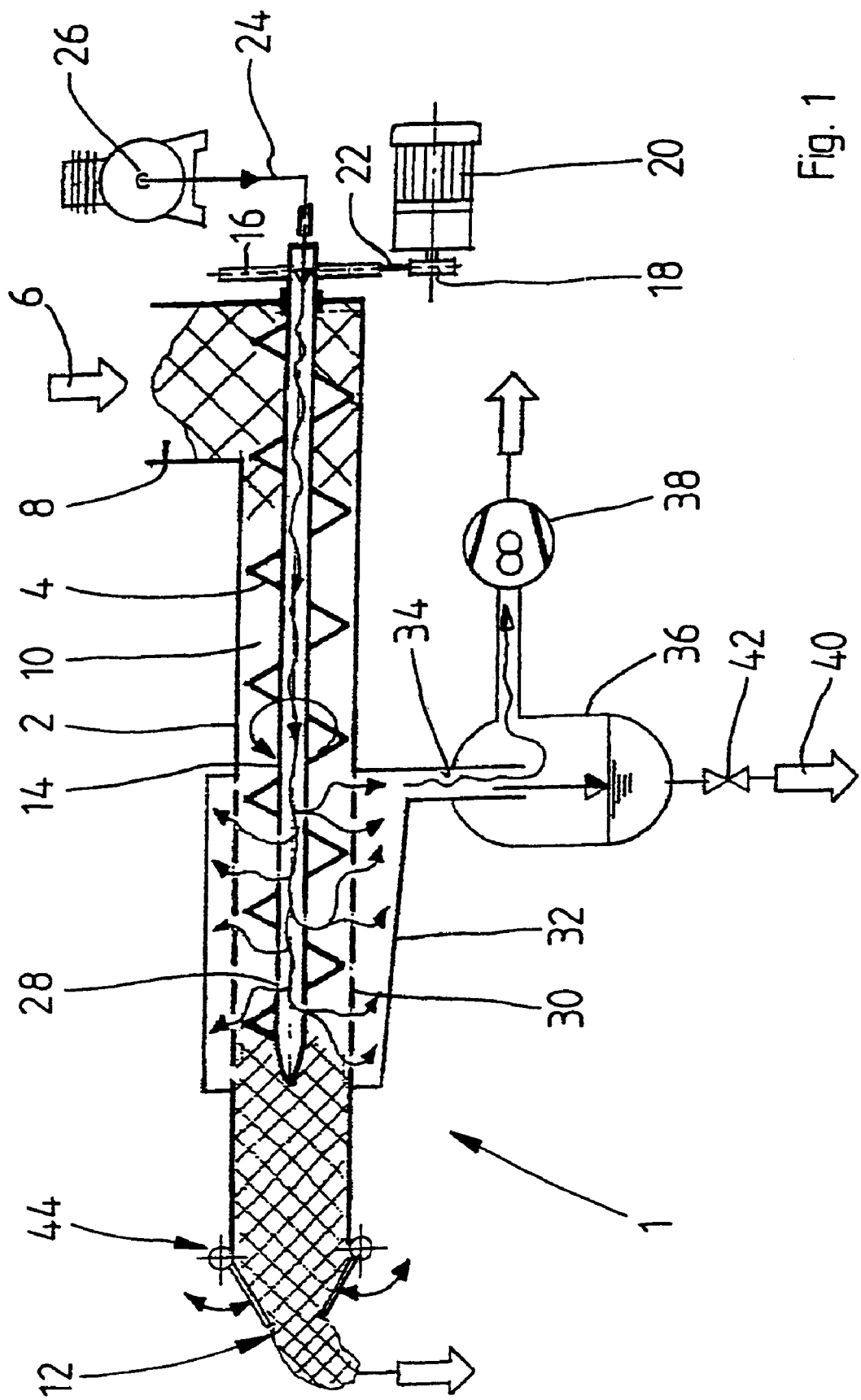
FIG. 1 is a longitudinal sectional view of a press in accordance with the invention for the dehumidification of residual waste.

The press 1 represented in FIG. 1 comprises a worm gear housing 2 wherein a worm gear 4 is mounted rotatably. Through the intermediary of this worm gear 4, residual waste 6 may be drawn via a material drawing-in device 8 into a worm gear space 10 and transported to a material discharge 12. Through a suitable pitch of the worm gear helices, the humid residual waste 6, i.e., the residual waste charged with water, is compressed, with water being squeezed out in the process.

The worm gear 4 has a lance-shaped central tube 14 at the outer circumference of which the worm gear helices are attached. An end portion of the central tube 14 protrudes from the worm gear housing 2. This end portion carries a drive pinion 16 which is in operative connection with an output gear 18 of a drive motor 20. In the represented embodiment, the drive pinion 16 and the output gear 18 are interconnected through a belt or a chain 22.

The end portion of the central tube 14 which protrudes from the worm gear housing 2 is connected with a pressurized air compressor 26 via a pressure line 24, so that pressurized air may be injected into the central tube 14.

On the left-hand end portion of the central tube 14 in the representation of FIG. 1 a multiplicity of outlet nozzles 28 are formed through which the pressurized air may exit from the central tube 14. In the embodiment represented in FIG. 1, these outlet nozzles 28 are formed along one end portion of the central tube 14 only—in principle, however, it is possible to provide these outlet nozzles over the entire length of the central tube. By the solution selected in FIG. 1 it is ensured that the pressurized air enters into the worm gear space 10 within a range in which the residual waste already is present in a compressed form.

In a position approximately radially opposite the outlet nozzles 28 there is formed on the peripheral wall of the worm gear housing 2 a strainer basket 30 which is encompassed by a vacuum box 32. This vacuum box 32 comprises a suction nozzle 34 opening into a condenser 36. To the gas chamber of the condenser 36 there is connected a vacuum pump 38 whereby the vacuum box 32 and the condenser 36 may be subjected to a reduced pressure of 0.9 bar, for example. The condensate 40 may be extracted via a valve means 42 and supplied to further processing.

On the left-hand end portion of the worm gear housing 2 in the representation of FIG. 1 a backup pressure means 44 is provided whereby the diameter of an outlet nozzle of the material discharge 12 may practically be modified so that a counterpressure counteracting an axial displacement of the residual waste may be built up in the worm gear housing 2.

Figure 2:
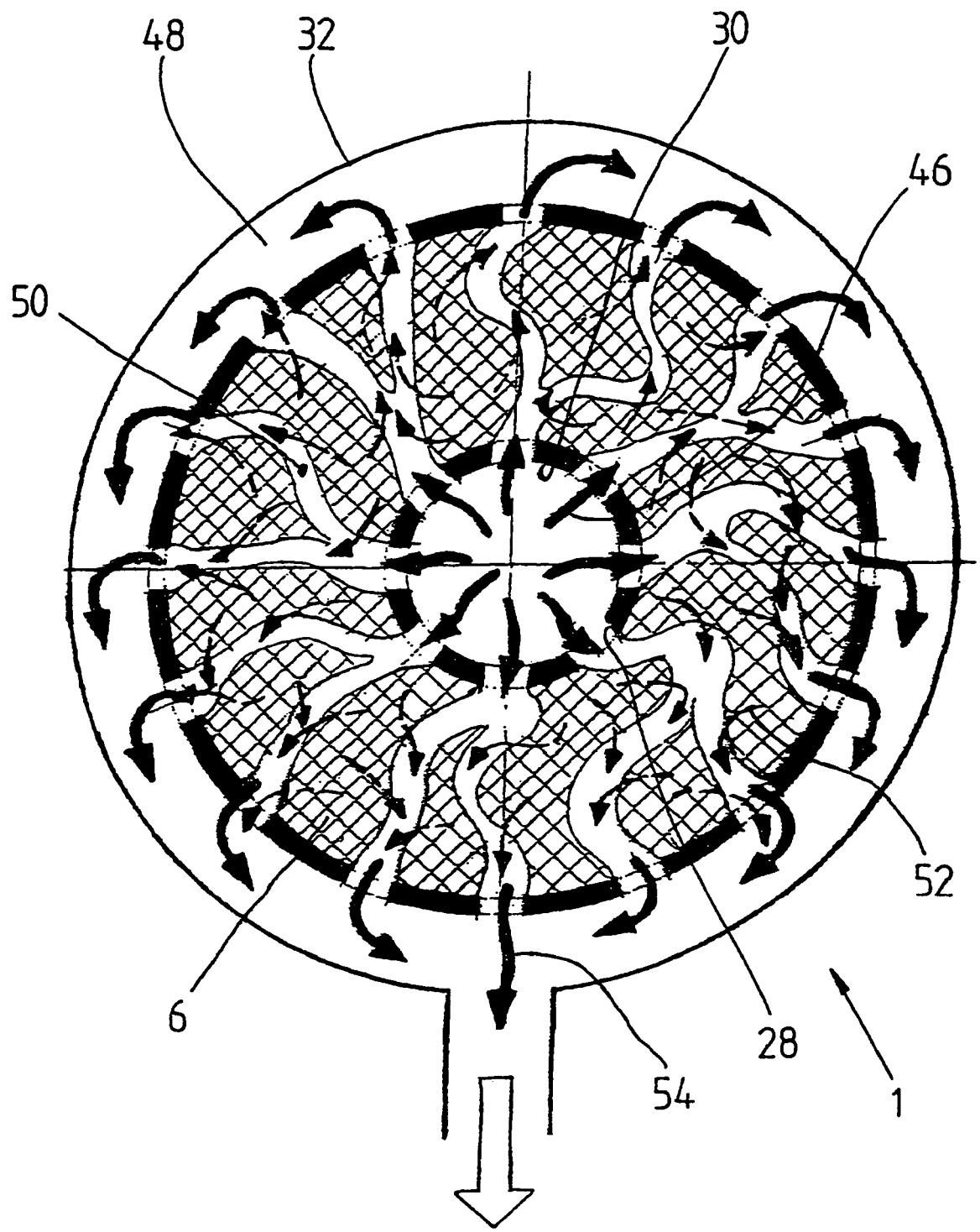
FIG. 2 is a schematic cross-sectional view of the press of FIG. 1.

The residual waste 6 to be dehydrated is drawn in by the rotating worm gear 4 into the worm gear space 10 and, in the representation in accordance with FIG. 1, transported to the left into the area encompassed by the vacuum box 32 and partly compressed in the process. Pressurized air is injected via the pressurized air compressor 26 into the rotating central tube 14 of the worm gear 4 at a predetermined overpressure which is, e.g., by approximately 3 bars higher than the pressure applied via the backup pressure means 44. In accordance with FIG. 2, which shows a cross-sectional view of the press 1 in FIG. 1, the unfreighted pressurized air 46 radially exits through the outlet nozzles 28 of the strainer basket 30 from the central tube 14 and impacts on the residual waste to be dehydrated. At the annular space 48 encompassed by the vacuum box 32 a reduced pressure is applied by the vacuum pump 38, so that the pressurized air flows through the residual waste 6 due to the pressure difference (pressure of the pressurized air delivered by the compressor 26—reduced pressure of the vacuum pump 38) in a radial direction, i.e. transversely to the axis of the worm gear 4. Owing to this comparatively high pressure difference, flow channels 50 form within the residual waste 6 which do, however, have a constantly changing course. As a result of this pressurized air flow and the mechanical compression of the residual waste via the worm gear 4, water 52 is drawn from the residual waste 6 and transported into the vacuum box 48 together with the pressurized air 46. The pressurized air 54 loaded with water then enters into condenser 36 in the direction of the arrow and is there condensed in the above described manner. The amount of pressurized air exiting via the material discharge is negligible.

By the above described press 1 it is possible, in the treatment of residual waste containing organic constituents, to adjust a dry substance content of 60-70%, so that the expenditure for post-drying of the residual waste is minimum compared with conventional solutions.

In the above described embodiment the worm gear helices are mounted at the outer circumference of the central tube 14. In principle, the central tube might also be mounted to be non-rotary in the worm gear housing 2 and extend through the rotatably driven worm gear in the axial direction.

The above described press 1 may, of course, also be utilized for the dehumidification of other humid matters.

Under particular operating conditions it may be sufficient if the press 1 is operated with pressurized air only or with vacuum only.

A press for the dehumidification of humid matter, in particular of residual waste is disclosed, which comprises a worm gear whereby the residual waste may be compressed mechanically. During transport with the aid of the worm gear, the humid matter is subjected to a drying medium, preferably pressurized air or a vacuum, whereby it is delivered from the press.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

LIST OF REFERENCE SYMBOLS

1 Press
2 worm gear housing
4 worm gear
6 residual waste
8 material drawing-in device
10 worm gear space
12 material discharge
14 central tube
16 drive pinion
18 output gear
20 drive motor
22 chain
24 pressure line
26 pressurized air compressor
28 outlet nozzles
30 strainer basket
32 vacuum box
34 suction nozzle
36 condenser
38 vacuum pump
40 condensate
42 valve means
44 backup pressure means
46 pressurized air
48 annular space
50 flow channel
52 water
54 freighted pressurized air

The invention claimed is:

1. A press for the dehumidification of a humid substance, in particular of residual refuse, which includes a worm gear whereby said humid matter is transported from a material drawing-in device to a material discharge and is concurrently compressed for the dehumidification, the press comprising:

a means whereby said humid matter compressed with the aid of said worm gear is subjected to a drying medium, wherein said drying medium is one of a group including pressurized air and vacuum, so that said drying medium either flows through said humid matter or the humidity is transported off, respectively; and wherein said means includes a central tube encompassed by said worm gear and designed to include outlet nozzles for said drying medium, and wherein said nozzles are formed substantially only along one end portion of the central tube, and wherein a worm gear housing is designed to include a strainer basket through which said freighted drying medium may be transported off only in the range of said outlet nozzles.

2. The press in accordance with claim 1, including a vacuum pump through which a reduced pressure for transporting off said freighted drying medium is applied.

3. The press in accordance with claim 1, wherein downstream of said strainer basket a condenser for condensing the humidity transported off jointly with said drying medium is provided, wherein said vacuum pump is connected to said condenser.

4. The press in accordance with claim 1, including a backup pressure means for adjusting a backup pressure in the range of said material discharge.

5. The press in accordance with claim 1, wherein said drying medium flows through said humid substance approximately in a direction transverse to the worm gear axis.

6. The press in accordance with claim 1, wherein said drying medium is supplied at an excess pressure which is approximately about 1 bar higher than the pressure in the range of the material discharge.

7. The press in accordance with claim 1, wherein said central tube is mounted to be non-rotary.

* * * * *